United States Patent [15] 3,700,830

Naylor et al. [45] Oct. 24, 1972

[54] AUTOMATIC CALL THROUGH TEST SET

[72] Inventors: David C. Naylor, Dollard des Ormeaux, Quebec; Derek Leyburn, Mississauga, Ontario, both of Canada

[73] Assignee: Bell Canada, Montreal, Quebec, Canada

[22] Filed: July 7, 1970

[21] Appl. No.: 52,792

[52] U.S. Cl. ..........179/175.2 R
[51] Int. Cl. ..........H04m 3/22
[58] Field of Search ..........179/175.2 C, 175.2 R

[56] References Cited

UNITED STATES PATENTS

| | | | |
|---|---|---|---|
| 3,069,512 | 12/1962 | McAllister | 179/175.2 R |
| 3,239,612 | 3/1966 | McAllister | 179/175.2 R |
| 2,697,140 | 12/1954 | Cornell et al. | 179/175.2 R |
| 2,680,161 | 6/1954 | Clement | 179/175.2 R |

*Primary Examiner*—Kathleen H. Claffy
*Assistant Examiner*—Douglas W. Olms
*Attorney*—Cushman, Darby & Cushman

[57] ABSTRACT

This application discloses a test set for testing the telephone switching equipment at an automatic telephone office. The test set can be connected by patch cords to 20 subscriber lines at the office, and the test set can be set to "dial" any desired seven figure telephone number. The test set takes each trunk in turn and "dials" the selected number. Prior to each "digit," automatic tests are carried out to check for (a) open loop; (b) open sleeve; and (c) reversed loop. At the completion of the dialing operation i.e. the 7th digit, two further tests are carried out (d) no answer, and (e) slow release. If a fault appears at any test, the test set stops and indicates the faulty trunk and the type of fault. If no fault appears, once one trunk is tested the next trunk is seized and tested. Further, after one set of "connectors" is tested, the next set of "connectors" is similarly tested.

19 Claims, 19 Drawing Figures

INVENTORS
DAVID C. NAYLOR
DEREK LEYBURN

BY
Cushman, Darby & Cushman
ATTORNEYS

INVENTORS
DAVID C. NAYLOR
DEREK LEYBURN

BY
Cushman, Darby & Cushman
ATTORNEYS

PATENTED OCT 24 1972

3,700,830

SHEET 03 OF 14

INVENTORS
DAVID C. NAYLOR
DEREK LEYBURN

BY
Cushman, Darby & Cushman
ATTORNEYS

INVENTORS
DAVID C. NAYLOR
DEREK LEYBURN
BY Cushman, Darby & Cushman
ATTORNEYS

INVENTORS
DAVID C. NAYLOR
DEREK LEYBURN

BY Cushman, Darby & Cushman
ATTYS

INVENTORS
DAVID C. NAYLOR
DEREK LEYBURN
BY Cushman, Darby & Cushman
ATTORNEYS

INVENTORS
DAVID C. NAYLOR
DEREK LEYBURN
BY Cushman, Darby & Cushman
ATTORNEYS

CONNECTOR GROUP LAMPS

INVENTORS
DAVID C. NAYLOR
DEREK LEYBURN
BY Cushman, Darby & Cushman
ATTORNEYS

INVENTORS
DAVID C. NAYLOR
DEREK LEYBURN
BY Cushman, Darby & Cushman
ATTORNEYS

INVENTORS
DAVID C. NAYLOR
DEREK LEYBURN

BY Cushman, Darby & Cushman
ATTORNEYS

INVENTORS
DAVID C. NAYLOR
DEREK LEYBURN
BY Cushman, Darby & Cushman
ATTORNEYS

INVENTORS
DAVID C. NAYLOR
DEREK LEYBURN
BY Cushman, Darby & Cushman
ATTORNEYS

AUTOMATIC CALL THROUGH TEST SET

This invention relates to means for testing the switching equipment in automatic telephone exchanges or offices.

With the almost universal adoption of automatic telephone offices, the problem arises of making regular checks on the proper working of the various trunks or switching paths. Thus each subscriber has a line with three conductors known respectively as tip, ring and sleeve as a relic of the days when a telephone office included a rack of jacks into any one of which a plug could be inserted having a ball-like metal tip, a metal ring, and a tubular metal sleeve, these three items being insulated from one another and being connected respectively to three leads given the same names. In an automatic office, these plugs and jacks are no longer used, and while most interconnections are made by automatic switching equipment, the operator can take calls and can switch them, but for this purpose she makes use of switches on her console and a standard telephone dial mechanism. The servicing problem involves checking that each incoming line with its set of conductors can be connected by the subscriber dial mechanism through a properly operating trunk at the exchange to a desired "called" number.

An object of the present invention is the provision of automatic test equipment able to check the serviceability of a large number of trunk circuits, by which term is meant both the necessary conductors and the various switching means associated with those conductors.

According to one aspect of the present invention a test set adapted to test each of a group of serially-connected selector devices in a telephone exchange, comprises automatic pulse generating means arranged to apply to a selected subscriber's line a series of groups of dialing pulses such as would cause the automatic serially-connected selector devices to establish a trunk connection from the said subscriber's line to a proper termination point; fault detection means arranged to carry out at least one test for a particular fault after each group of pulses, denoting a digit, has been transmitted, and upon the detection of that fault to arrest the pulse generating means; and switch means by which a holding signal can be applied to the trunk so far established to lock the selector devices in set position, whereby an operator can trace the trunk as established to locate the component giving rise to the said fault.

The invention will now be described, by way of example, with reference to the accompanying drawings, in which.

Figure 1:
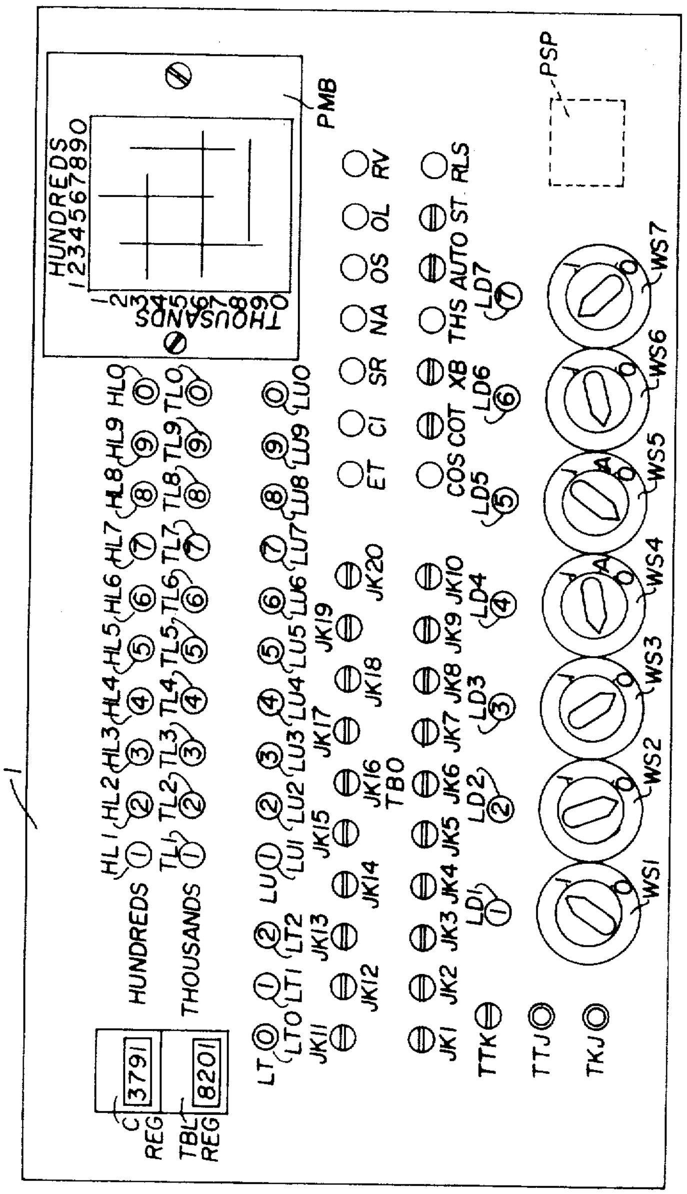
FIG. 1 is a diagrammatic representation of the front panel of an automatic call-through test set.
Figures 12, 17:
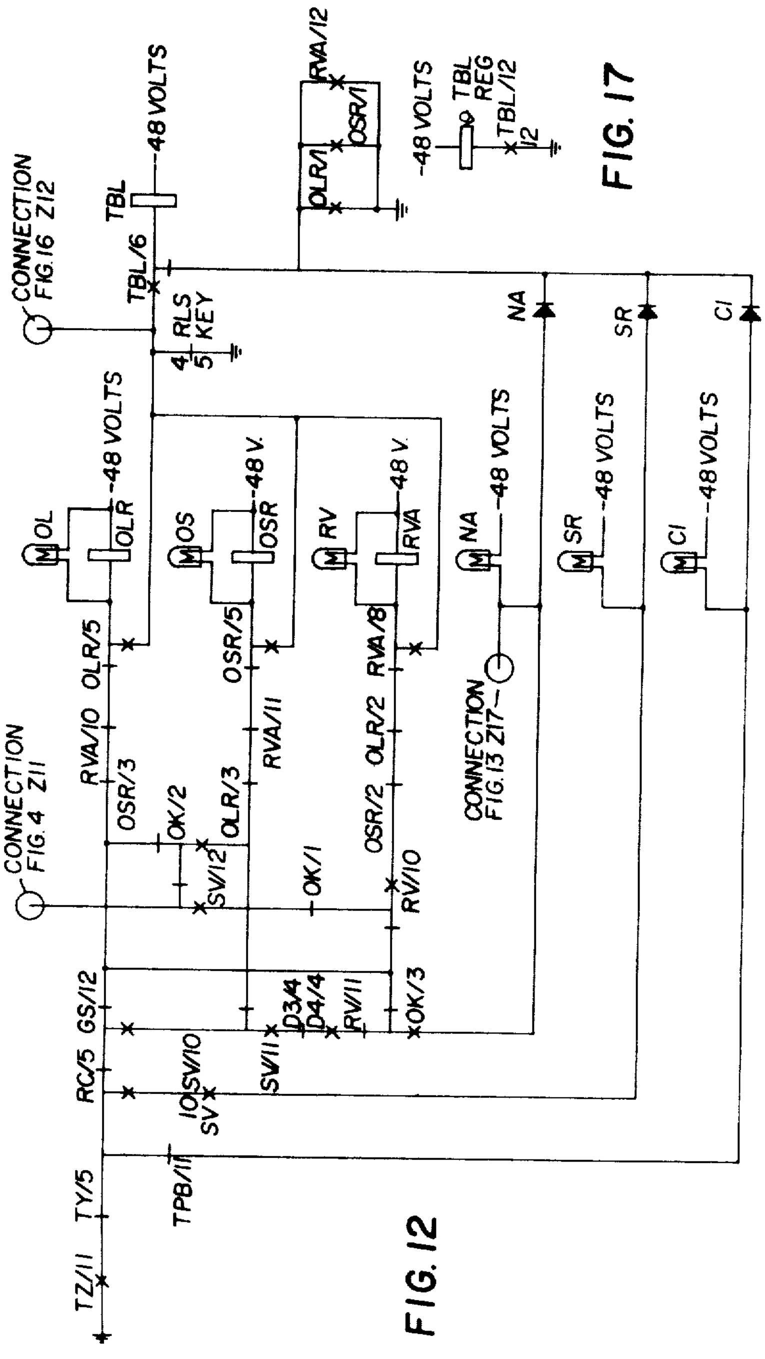
FIG. 12 is a circuit diagram showing the interconnection of a group of fault indicating signal lamps shown in FIG. 1.
Figure 18:
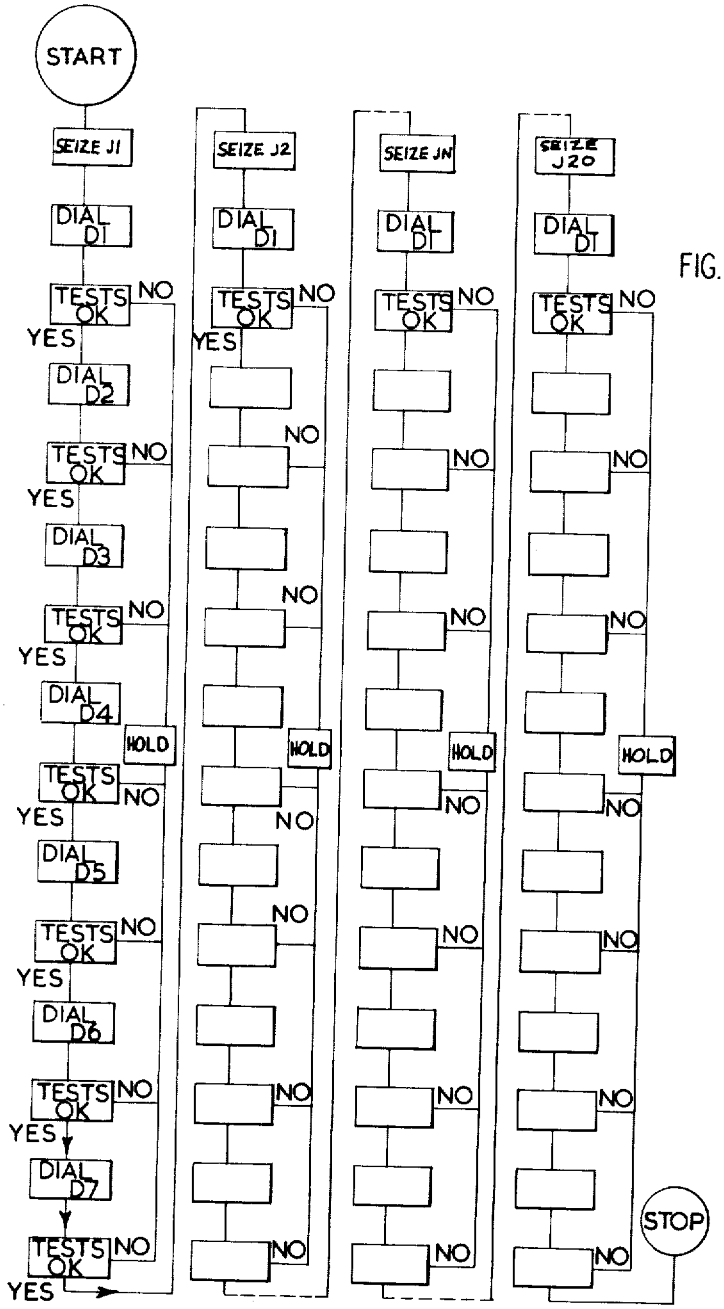
Figure 19:
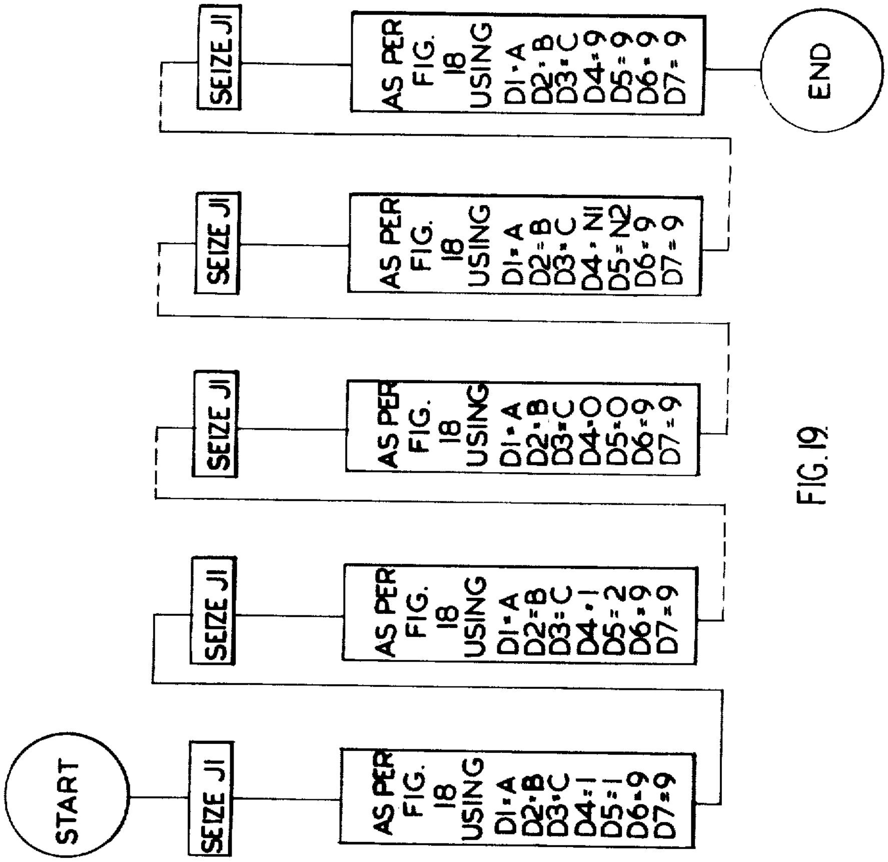

FIG. 17, which is located on the same sheet as FIG. 12, is a circuit diagram of a trouble register indicated in FIG. 1;

FIG. 18 is of the nature of a flow-diagram indicating one mode of operation of the test set; and FIG. 19 is a similar flow-diagram indicating an "AUTO" alternative mode of operation.

Referring first to FIG. 1, this shows the front panel of an automatic call-through test set 1, adapted to test automatically in turn a large number of trunk circuits, by which term is meant both the necessary conductors and the various switching means associated with those conductors. The test set as shown will test only circuits in the local EAS area, which is the area in which free local calls can be made and which therefore does not involve use of DDD (distance direct dialing) equipment or of call logging equipment to permit the making of a record of calls for the subsequent charging of subscribers for calls made. It will be clear to those skilled in the art that the test set could be modified to overcome these two limitations, but rarely would such a modification be required. The test set will normally be used by service personnel based on a given telephone exchange area, and therefore the service personnel are concerned in testing only local equipment in their area.

For the making of local calls in North America , one must dial a group of three digits to indicate the "exchange" (or "office") required, and a further group of four digits to indicate the required subscriber on the selected office. The test set therefore includes along the lower edge of its front panel a set of seven wafer switches designated WS1 through WS7, of which switches WS1, WS2, WS3, WS6 and WS7 are ten-position switches, with control knobs settable to calibrations running anticlockwise from 1 through 9 followed by 0; while switches WS4 and WS5 are 11-position switches settable to calibrations running anticlockwise from 1 through 9 followed by 0 and then by A. Above the seven switches are arranged respectively seven lamps LD1 through LD7.

To the left of these seven switches are disposed a "-TALK" jack TKJ, a "TRANSMISSION TEST" jack TTJ, and a transmission test enabling switch or key TTK.

Above the seven switches, and extending as two horizontal rows over the left-hand side only of the panel, are 20 switches or keys JK1 through JK20 controlling the connection of certain signals to 20 trunk jacks (referred to hereinafter as jacks J1 through J20) provided on the back of the test set and connectable respectively by twenty jumpers to a selected 20 groups of subscriber lines to be tested.

Also above the seven switches, but on the right hand half only of the front panel, is an arrangement of indicator lamps and switches or keys as set out below:

| | |
|---|---|
| ET | a lamp |
| CI | a lamp |
| SR | a lamp |
| NA | a lamp |
| OS | a lamp |
| OL | a lamp |
| RV | a lamp |
| COS | a push-button switch or key |
| COT | a switch or key |
| XB | a switch or key |
| this | a push-button switch or key |
| AUTO | a switch or key |
| ST | a switch or key |
| RLS | a push-button switch or key |

Extending across a central portion of the top of the front panel are two horizontal rows of indicator lamps. The upper row is labelled HUNDREDS and consists of 10 lamps numbered respectively 1 through 0 and given reference numerals HL1 through HL0; the lower row is labelled THOUSANDS and consists of 10 lamps numbered respectively 1 through 0 and given the reference numerals TL1 through TL0.

Below these lamps is a row of three lamps labelled LT and numbered 0 through 2, and given the reference numerals LT0 through LT2; and in alignment with those lamps, a series 10 lamps labelled LU and numbered 1 through 0 and given the reference numerals LU1 through LU0.

Mounted at the upper right-hand corner of the front panel is a program matrix board PMB which consists of an arrangement of 10 vertical columns and 10 horizontal rows of holes into any of which a special pin plug can be inserted. The columns are labelled HUNDREDS and from 1 through 0, and the rows are labelled THOUSANDS and from 1 through 0.

At the top left of the panel are mounted two registers designated respectively "C. REG." and "TBL. REG.."

Mounted on the back panel of the test set is a four pin plug PSP adapted for connection by a standard lead to a standard supply socket at the telephone exchange, the four leads to this plug being respectively:

| | |
|---|---|
| black | a connection to continuous ground; |
| red | a connection to a −48 volts direct current supply |
| yellow | a connection to ground interrupted at 120 interruptions per minute (i.p.m.); and |
| green | a connection to a high frequency tone supply |

Figure 2:
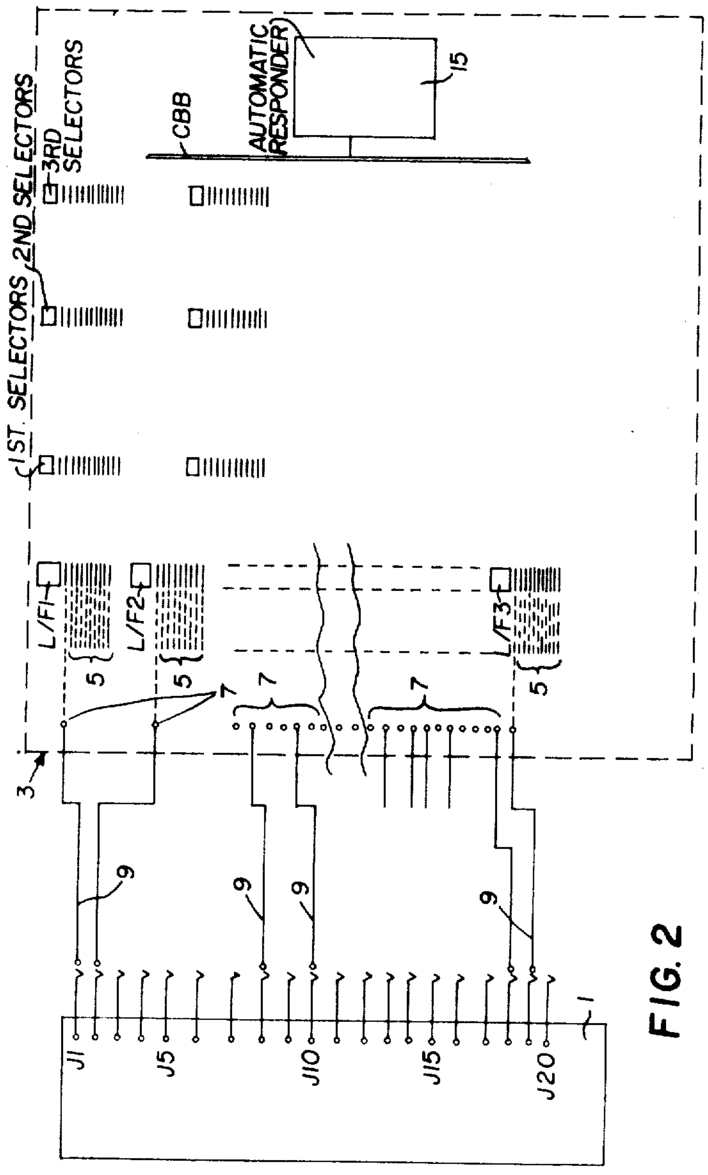
FIG. 2 is a diagrammatic representation of a telephone exchange to which the test set of FIG. 1 is connected.

Referring now to FIG. 2, this figure shows a few of the incoming "lines" at the telephone exchange 3, and these are indicated by the arrowheads 5. These incoming lines are arranged in groups, and each group is served by a linefinder. "Linefinders" are well known in the telephone art and are considered to require no detailed description herein. In FIG. 2, three of the many linefinders at the exchange are indicated respectively as L/F1, L/F2 and L/F3. When, for any subscriber in a group, the telephone is lifted off its cradle switch, the associated line finder such as linefinder L/F1 is activated and scans over the associated subscriber's lines until it finds the line which activated it, and then locks on that line and connects it to the next part of the exchange equipment.

In each group of subscriber's lines, i. e. in each group of lines associated with a linefinder, one line will be provided with a jack by which an engineer at the exchange can connect test equipment to that particular subscriber's line. In FIG. 2, these jacks are indicated by the numeral 7.

In use of the test set 1, the 20 jacks J1 through J20 will be connected respectively by 20 patch cords 9 to a selected 20 of the jacks 7. For convenience, the 20 selected jacks will be referred to as trunks T1 through T20, each jack such as jack J1 being connected by a patch cord 9 to its correspondingly numbered jack such as trunk T1.

In orthodox manner, each linefinder is associated with a first grouP selector 1st SEL. associated only with that linefinder group selectors are well known in the telephone art and are considered to require no detailed description herein. This group selector has 10 working levels and in use sets itself to a level corresponding to the number of digit pulses received from the dial mechanism of a calling subscriber. It then scans that level to find a "free " 2nd group selector 2nd SEL. There will usually be a number of group selectors in "-series" in an automatic telephone office, the number depending upon the number of lines or digits with which thAt office is called upon to deal. Each group selector in the series chain usually deals with only one incoming digit, and the last two digits are handled by a "connector" associated with the called subscriber.

In order to facilitate testing of equipment, telephone companies reserve certain "subscriber numbers" for test purposes. Thus under one common system, all the subscriber numbers ending with —99 are brought out to a common bus bar CBB in FIG. 2, and this bus bar will usually be connected to an automatic responder 15. Such automatic responders are well known in the telephone art, and are considered to require no detailed description herein. When a linesman needs to check some part of the telephone company's equipment, he can call a number ending in —99, and the automatic responder answers the call so that operator time is not wasted.

The circuit inside the test set 1 consists for the most part of electromagnetic telephone relays of the wire-spring type. In such relays, an E-shaped magnetic core is provided on its central limb with an energizing coil, and a U-shaped armature is pivotally mounted by free ends of the legs of the U to this core so that the base of the U can be moved magnetically towards the free ends of the core limbs. Bias springs normally hold the base away from the core. Movement of the armature effects movement of a card of insulating material, and movement of the card moves movable wire-form electrical contact members into and out of contact with fixed wire-form contact members. In the following description, the operating coil of a relAy is identified by a reference letter or numeral, and different contacts of that relay are identified by the reference used for the coil, followed by a stroke (/) and the number of the relay contact. Further, in the drawings the legend X indicates a contact or switch which is normally open (i. e. when not "operated"), and a transverse line indicates a switch or contact which is normally closed (i. e., opens only when operated). It will be appreciated that in some instances a relay includes a single movable contact normally in contact with a first fixed contact but movable to contact a second fixed contact. The relay contact reference numeral will then occur twice, once in connection with the normally open contact, and once in connection with the normally closed contact.

It is not considered either practical or useful to describe in words every lead interconnecting the various keys, relay coils, and relay contacts involved. Each of the Figures of drawings will therefore be described generally, with a clear indication of the items shown, so that a person skilled in the art can understand clearly, from a study of the Figure, what items are used and how they are interconnected. The detailed operation of the complete test set will then be described.

Figure 3:
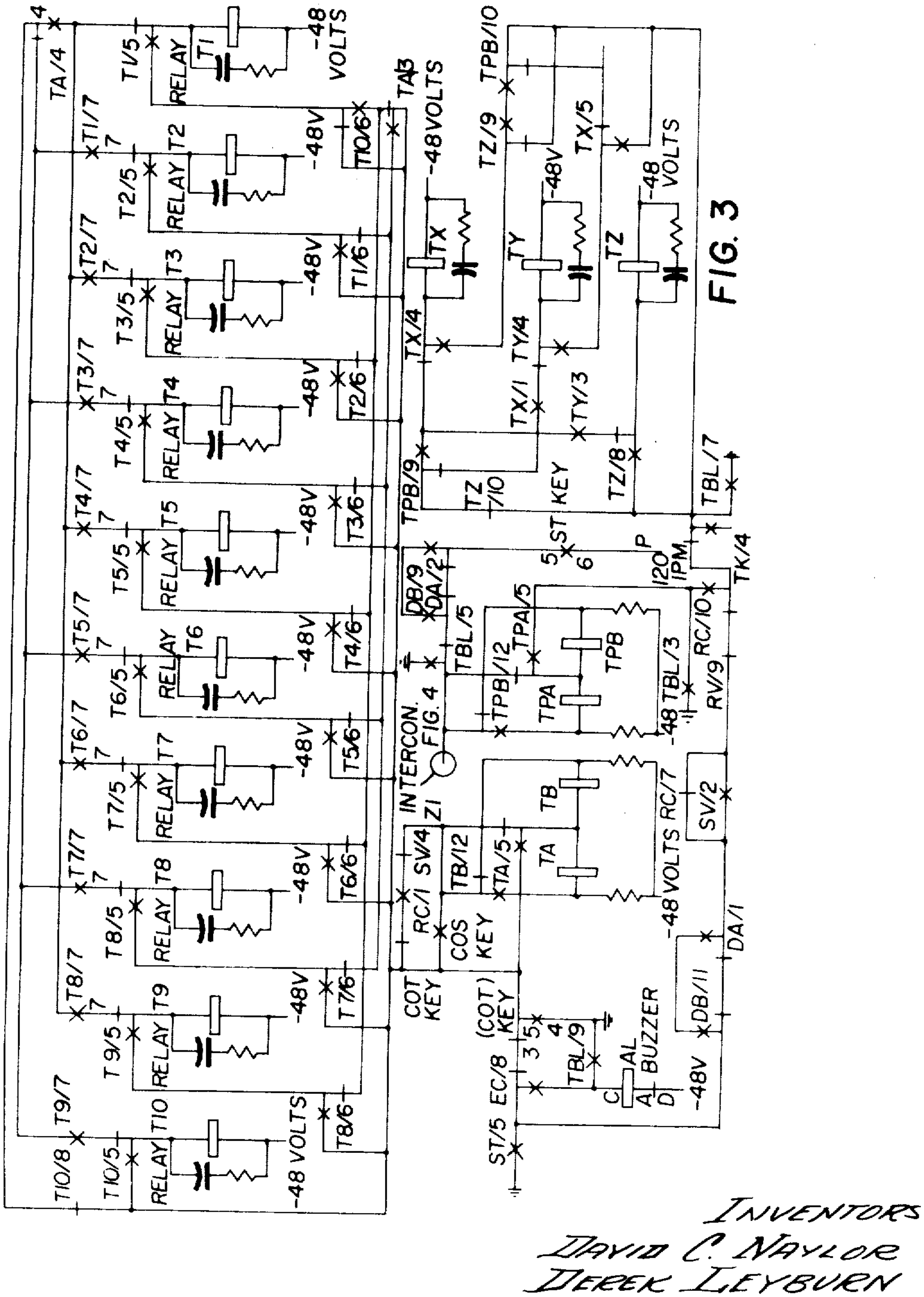
FIG. 3 is a circuit diagram showing primarily the interconnection of the operating coils of a group of relays controlling the selection of a trunk to be tested.
Figure 11:
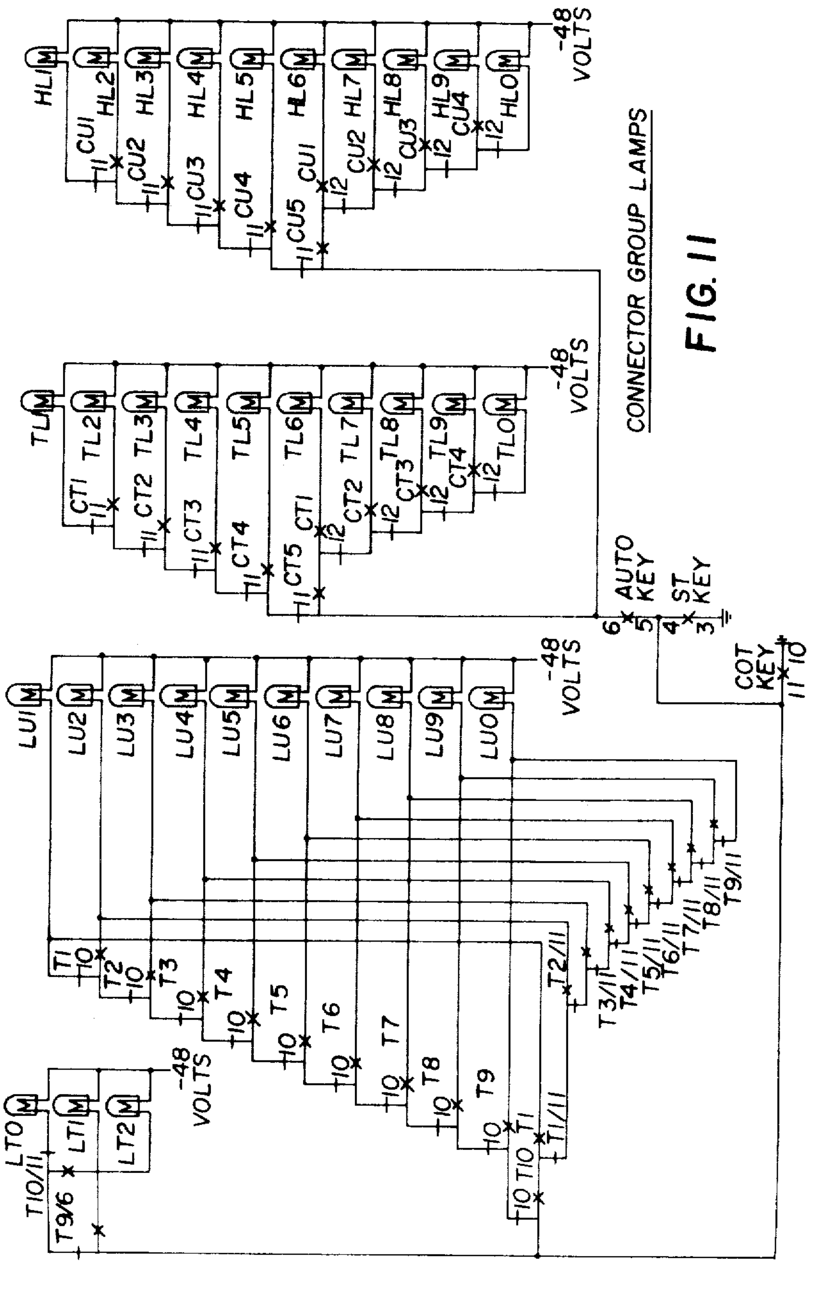
FIG. 11 is a circuit diagram showing the interconnection of groups of signal lamps shown in FIG. 1.
Figure 16:
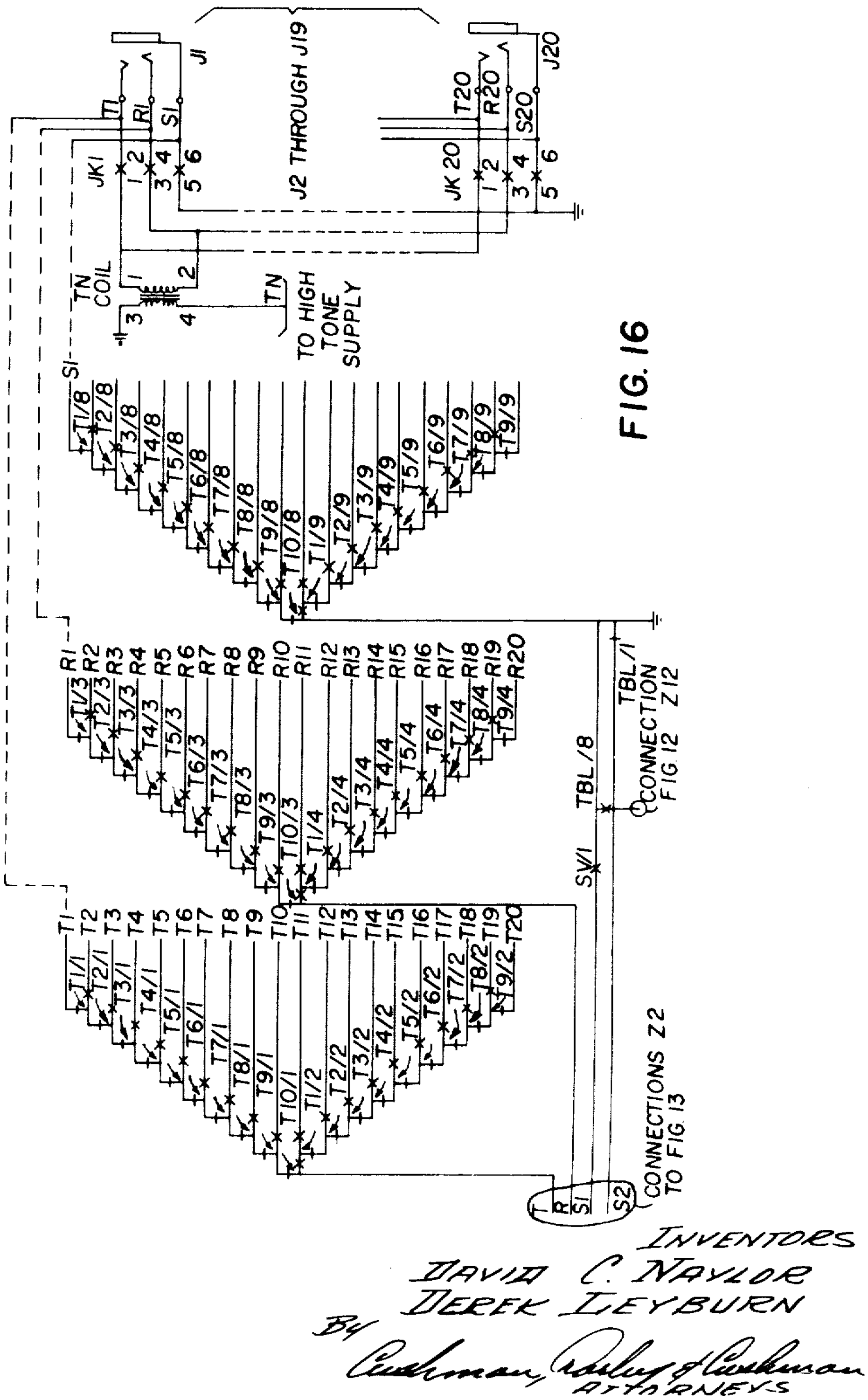
FIG. 16 is a circuit diagram of the contacts of the relays shown in FIG. 3 and operating to select a desired trunk for testing.

FIG. 3 shows a group of 10 relays labelled T1 through T10, and further relays designated TX, TY, TZ, TA, TB, TPA, TPB, each relay having a number of contacts indicated by reference numerals such as T9/1, T9/2, T9/3 and so on. Many of the relays are shunted by spark-quenching R/C networks as shown. One group of these contacts is shown in FIG. 16, and controls the connection of four leads marked T (for tip), R(for ring) and S1 and S2 (for sleeve) to a selected one only of the jacks J1 through J20 connected to the 20 trunks to be tested. A second group of these contacts is shown in FIG. 11, and controls the energization of the lamps LU1 through LU0, and the lamps LT0 through LT2. Certain of the contacts occur on FIG. 3, and their arrangement and connection are clearly set out in that Figure while their operation in use is described below.

Figure 4:
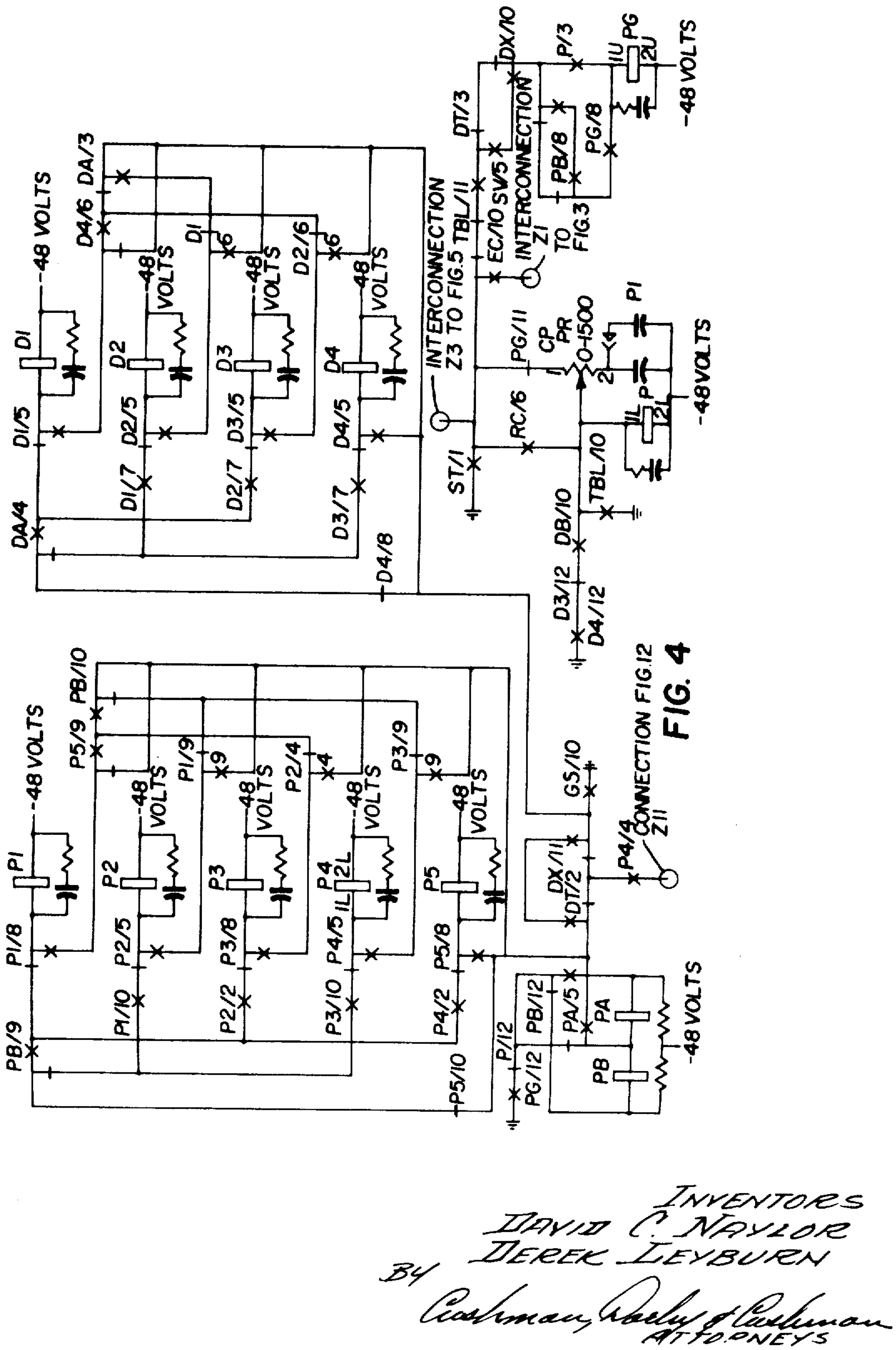
FIG. 4 is a circuit diagram showing primarily the interconnection of the operating coils of two groups of relays controlling respectively the timing of the test operation and the sequentially sending of digits of a called number.

FIG. 4 shows a first group of relays P1 to P5 and a second group of relays D1 to D4; and further relays designated P, PA, PB, PG. The contacts associated with each relay are numbered to indicate the relay, e. g. contacts of relay P5 are labelled P5/8 and P5/10. Many of these contacts are shown in FIG. 4, but other groups of these contacts are to be found in FIGS. 5 to 7.

Figure 5:
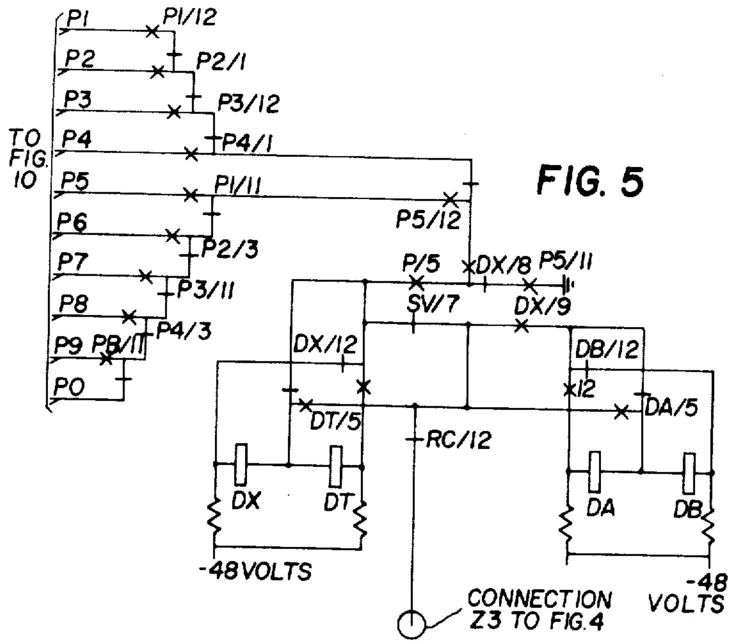
FIG. 5 shows the connections of relays forming two controlling flip-flops in the test set.

FIG. 5 shows four relays designated DA, DB, DX and DT. The contacts associated with each relay have been numbered to indicate that relay, thus for example contacts DX/8 and DX/12 are both contacts of relay DX. Some of these contacts are shown in the circuit of FIG. 5, and others are included in the circuits of FIGS. 4 and 13.

Figure 6:
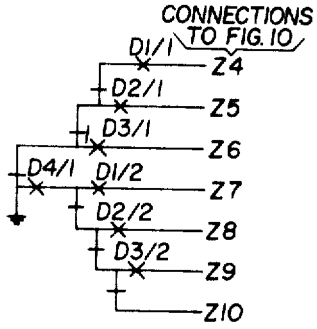
FIG. 6 shows the interconnection of certain relay contacts with seven "called number digit switches" shown in FIG. 1.
Figure 10:
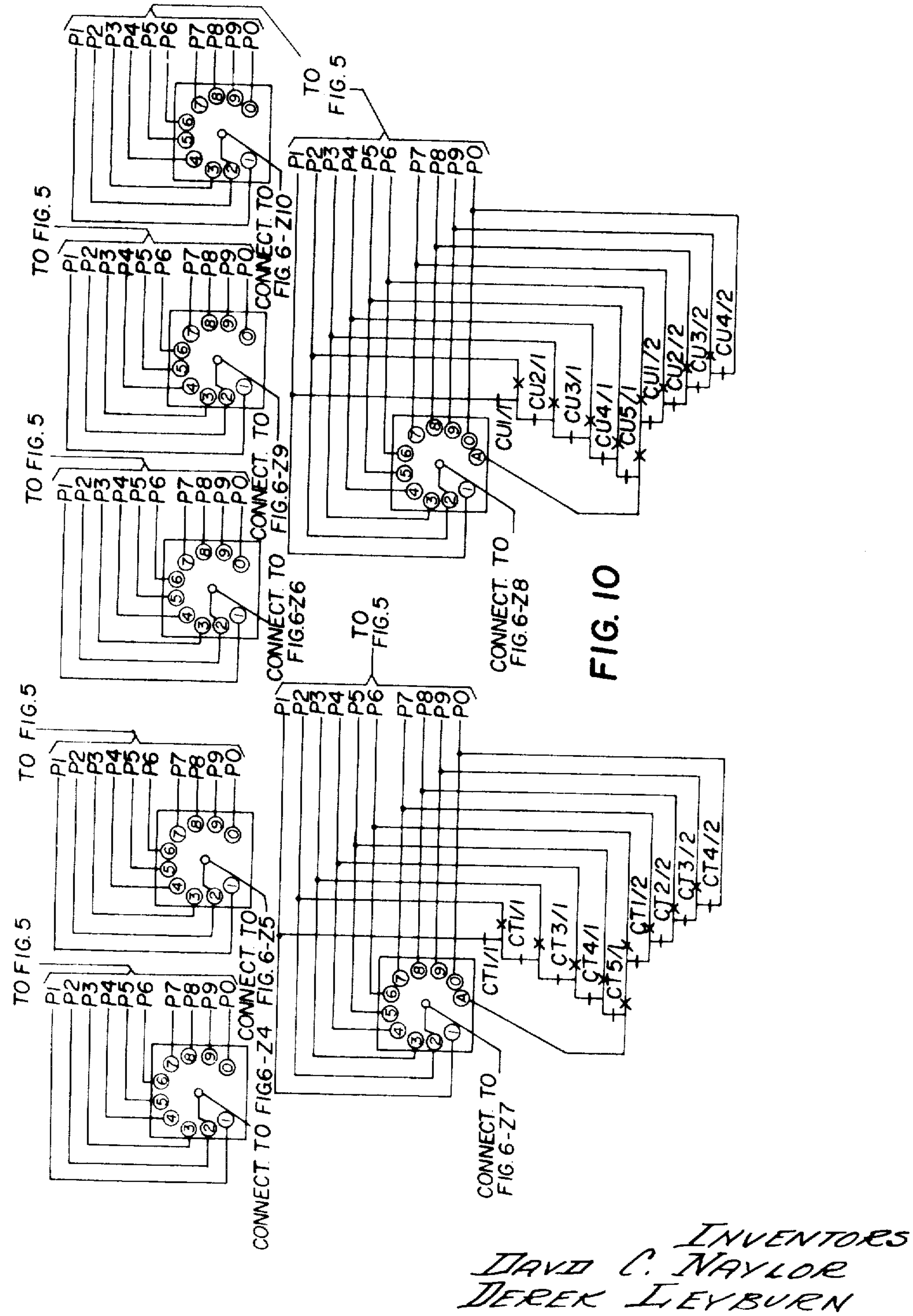
FIG. 10 is a diagrammatic representation of the connections to seven wafer switches shown in FIG. 1.

FIG. 6 shows the interconnection of certain of the contacts associated with relays D1 to D4 of FIG. 4 to the seven wafer switches WS1 through WS7 of FIG. 10.

Figure 7:
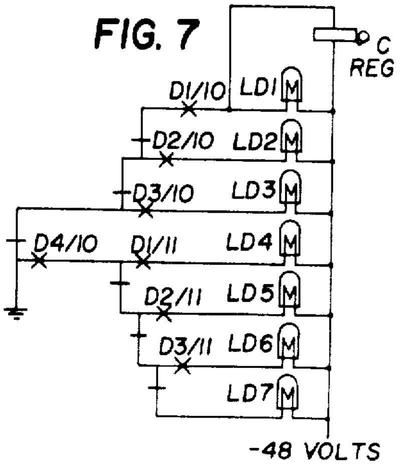
FIG. 7 shows the energization circuit for seven lamps corresponding respectively to the seven switches referred to above in connection with FIG. 6.

FIG. 7 shows the interconnection of certain of the contacts associated with relays D1 to D4 of FIG. 4 and of the lamps LD1 to LD7 of FIG. 1. Also included in this Figure is the operating coil of the register designated C. REG.

Figures 8, 9:
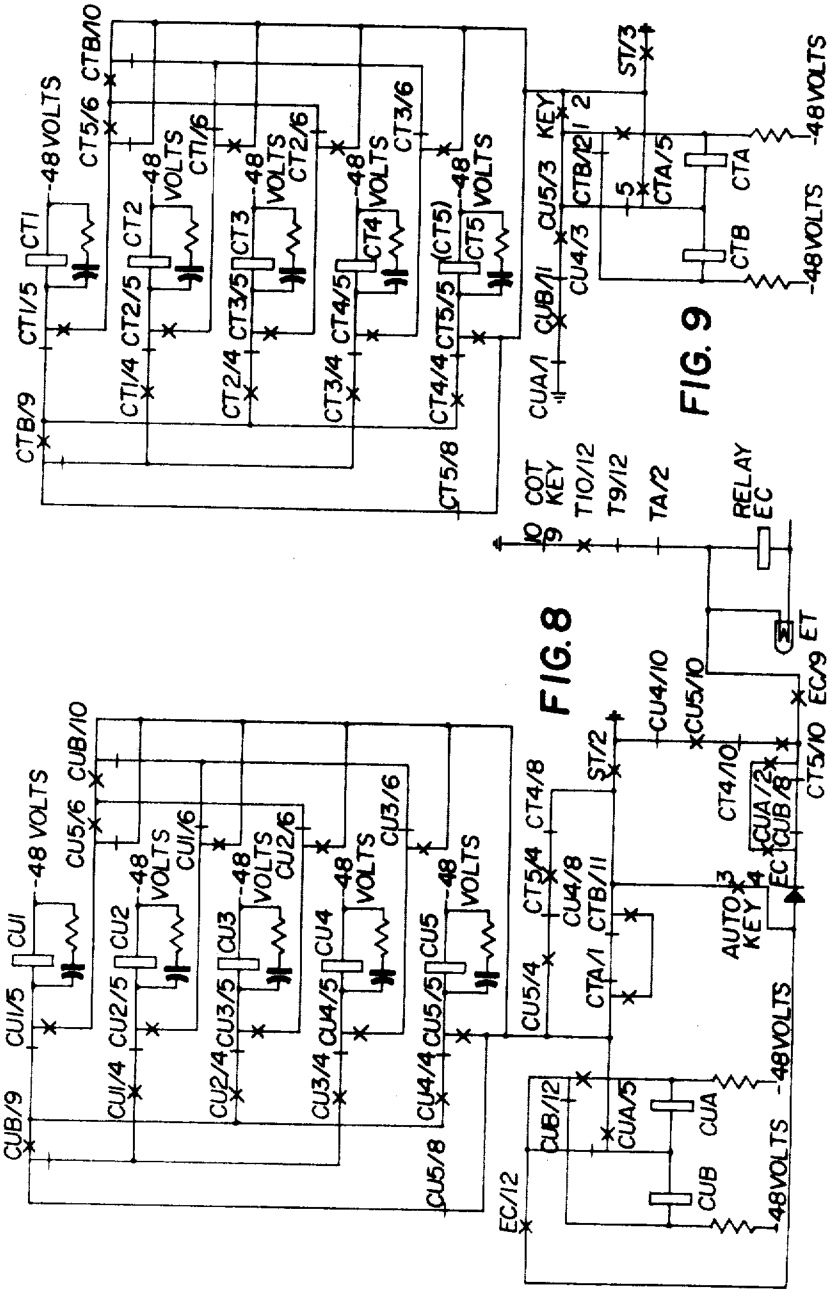
FIG. 8 shows the interconnection of a group of relays used for connector group units counting.
FIG. 9 shows the interconnection of a group of relays used for connector group tens counting.

FIG. 8 shows a group of relays designated CU1 through CU5, each relay having a number of contacts indicated by reference numerals such as CU4/4 and CU4/10. This Figure also shows two further relays EC, CUA and CUB, having contacts which include contacts designated CUA/5 and CUB/12. Some of these contacts are shown in the circuit diagram of FIG. 10, in which they effect a pulse counting function in conjunction with the wafer switch WS5, i.e. in connection with the "HUNDRED" digit of connector groups.

FIG. 9 shows a group of relays designated CT1 through CT5 and CTA and CTB. These are multi-contact relays and the contacts of relay CT1, for example, are designated by numerals such as CT1/4. Some of these contacts are shown in the circuit diagram of FIG. 10, in which they effect a pulse counting function in conjunction with the wafer switch WS4, i.e. in connection with the "THOUSANDS" digit of connector groups.

FIG. 10 illustrates the connections to the backs of the seven switches SW1 through SW7. Each switch is shown as having 10 output leads designated respectively P1 through P0, and these are all connected to the correspondingly numbered leads on FIG. 5. The movable contacts of the seven switches are connected respectively through connections Z4 through Z8 to correspondingly numbered leads in FIG. 6.

FIG. 11 is a diagrammatic representation of the three lamps LT0 through LT2 and of the 10 "units" lamps LU1 through LU0, which together indicate the "trunk " being tested; of the 10 "HUNDREDS" lamps HL1 through HL0 and of the 10 "THOUSANDS" lamps TL1 through TL0, which together indicate the "connector group" being called. This Figure also shows the action of a number of relay contacts which control the energization of the various lamps, including contacts for relays and keys shown in FIGS. 3, 8 and 9.

FIG. 12 shows the interconnection of four relays OLR, OSR, RVA, and TBL, the first three being associated respectively with the lamps OL, OS and RV mentioned above in connection with FIG. 1. This Figure also shows the connection of the lamps NA, SR and CI of FIG. 1, and includes three diodes marked respectively NA, SR and CI.

Figure 13:
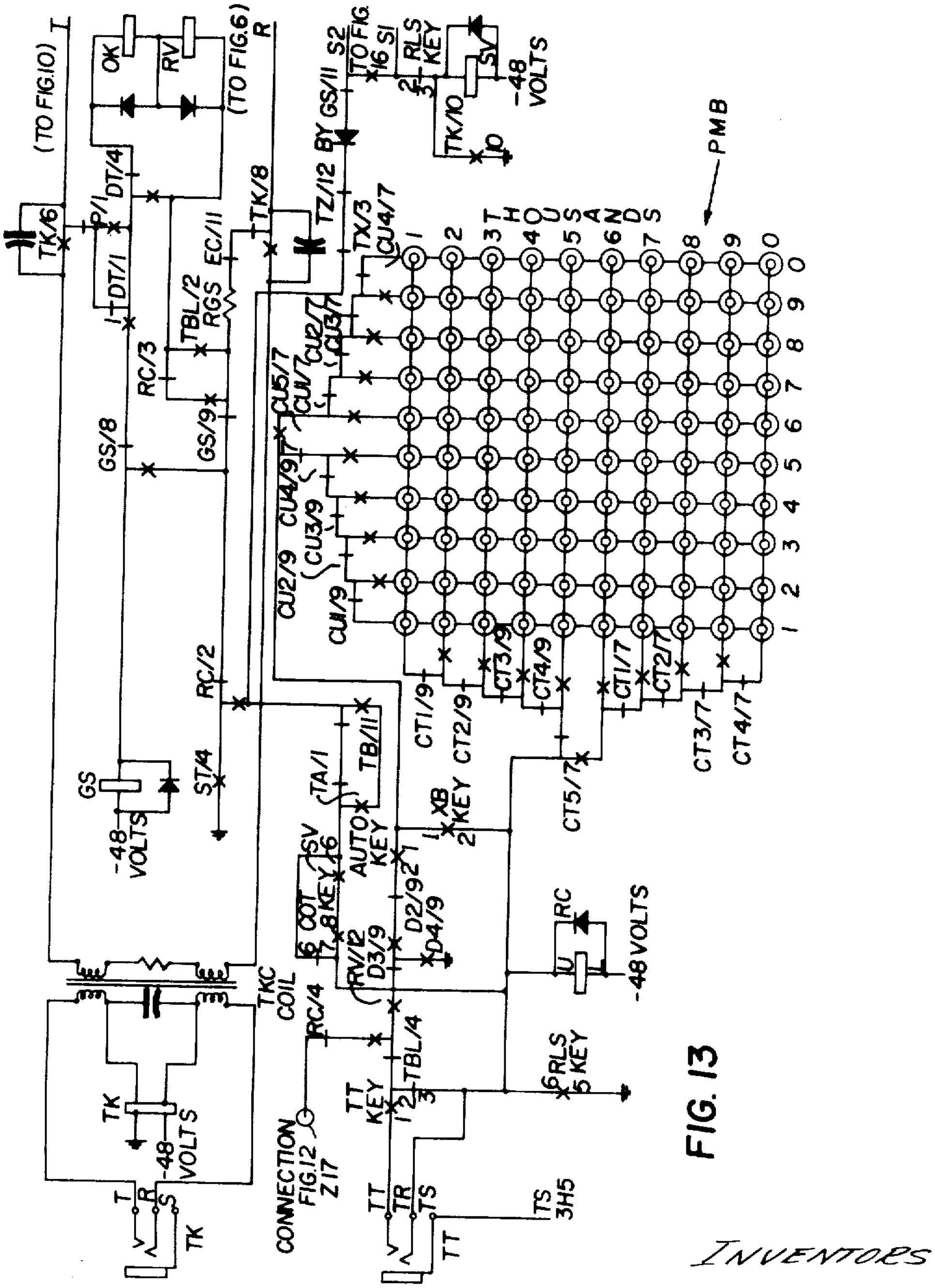
FIG. 13 is a circuit diagram of a matrix shown in FIG. 1, and of a group of fault detecting relays.

FIG. 13 includes the TK and the TT jacks, a talk relay TK, a "talk" coil designated TKC, a relay GS shunted by a diode, two series connected relays OK and RV both shunted by diodes, a relay SV shunted by a diode, and relay RC shunted by a diode. The matrix PMB of FIG. 1 also forms part of this Figure, each hole thereof being provided with a tip connection (the central circle), and a sleeve connection (the outer circle). As in the other figures, relay contacts are indicated by the numeral of the relay followed by a stroke and the number of the contact on that relay.

Figure 14:
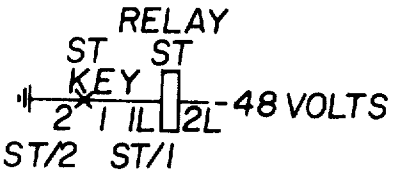
FIG. 14 is a circuit diagram of a starting relay of the test set.

FIG. 14 shows contacts of the start key ST and the start relay ST energized by closure of that key.

Figure 15:
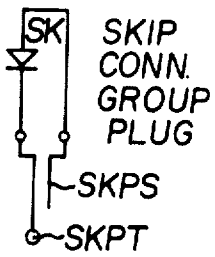
FIG. 15 is the circuit diagram of a connecting plug used in the matrix of FIG. 13.

FIG. 15 illustrates the form of the pin or plug which is inserted in one of the holes of the matrix board PMB of FIG. 1. The plug includes a tip SKPT and a sleeve SKPS connected together through a diode SK, as shown.

FIG. 16 is for the most part a circuit diagram showing the interconnection of relay contacts in the group of relays T1 through T10 shown in FIG. 3. It also shows how the jack keys JK1 through JK20 shown in FIG. 1 control the connection to the jacks J1 through J20 from a coil TN between tip and sleeve a high tone from the supply plug PSP mentioned in connection with FIG. 1. In this Figure, the leads T1, R1 and S1 are shown as connected respectively to the tip, ring and sleeve contacts of the jack J1, and it will be understood that the leads T2 through T20, the leads R2 through R20, and the leads S2 through S20 are similarly connected to the tip, ring and sleeve contacts of the corresponding jacks J2 through J20. The output from the coil TN is shown as applied through contacts of key JK1 (when operated) to the tip and sleeve contacts of jack J1, and similarly its output can be applied through keys JK2 through JK20 respectively to any of jacks JK2 through JK20. Keys JK1 through JK20 also serve (when operated) to apply ground to the associated jack.

FIG. 17 shows the TROUBLE register TBL REG and its connection to contacts TBL/12 of relay TBL (see FIG. 12).

The following table is included to facilitate the task of a reader in locating the various relays and their contacts in the various Figures. As regards each contact, its number is followed, in brackets, by the Figure in which it is to be found, e.g. relay contact RVA/10 is listed opposite relay RVA as "10(12)" to show that it is located on FIG. 12.

| Relay etc. Coil or | Ope rating Key FIG. | Contact (in figure) | |
|---|---|---|---|
| T1 | | | |
| 3 | | 1(16) 2(16) 3(16) 4(16) 5(3) | 6(3) 7(3) |
| | | 8(16) 9(16) 10(11) 11(11) | |
| T2 | 3 | 1(16) 2(16) 3(16) 4(16) 5(3) | 6(3) 7(3) |
| 8(16) 9(16) 10(11) 11(11) | | | |
| T3 | 3 | 1(16) 2(16) 3(16) 4(16) 5(3) | 6(3) 7(3) |
| | | 8(16) 9(16) 10(11) 11(11) | |
| T4 | 3 | 1(16) 2(16) 3(16) 4(16) 5(3) | 6(3) 7(3) |
| | | 8(16) 9(16) 10(11) 11(11) | |
| T5 | 3 | 1(16) 2(16) 3(16) 4(16) 5(3) | 6(3) 7(3) |
| | | 8(16) 9(16) 10(11) 11(11) | |
| T6 | 3 | 1(16 2(16) 3(16) 4(16) 5(3) | 6(3) 7(3) |
| | | 8(16) 9(16) 10(11) 11(11) | |
| T7 | 3 | 1(16 2(16) 3(16) 4(16) 5(3) | 6(3) 7(3) |
| | | 8(16) 9(16) 10(11) 11(11) | |
| T8 | 3 | 1(16) 2(16) 3(16) 4(16) 5(3) | 6(3) 7(3) |
| | | 8(16) 9(16) 10(11) 11(11) | |
| T9 | 3 | 1(16) 2(16) 3(16) 4(16) 5(3) | 6(11) 7(3) |
| | 8(16) 9(16) 11(11) 12(11) 12(8) | | |
| T10 | 3 | 1(16) 3(16) 5(3) 6(3) 8(3) | 9)16) 10(11) |
| | | 11(11) 12(8) | |
| TX | 3 | 1(3) 3(13) 4(3) 5(3) | |
| TY | 3 | 3(3) 4(3) 5(12) | |
| TZ | 3 | 8(3) 9(3) 10(3) 11(12) 12(13) | |
| TA | 3 | 1(13) 2(8) 3(3) 4(3) 5(3) | |
| TB | 3 | 11(13) 12(3) | |
| TPA | 3 | 5(3) | |
| TPB | 3 | 9(3) 10(3) 11(12) 12(3) | |
| P1 | 4 | 8(4) 9(4) 10(4) 11(5) 12(5) | |
| P2 | 4 | 1(5) 2(4) 3(5) 4(4) 5(4) | |
| P3 | 4 | 8(4) 9(4) 10(4) 11(5) 12(5) | |
| P4 | 4 | 1(5) 2(4) 3(5) 4(4) 5(4) | |
| P5 | 4 | 8(4) 9(4) 10(4) 11(5) 12(5) | |
| D1 | 4 | 1(6) 2(6) 5(4) 6(4) 7(4) | 10(7) 11(7) |
| D2 | 4 | 1(6) 2(6) 5(4) 6(4) 7(4) | 9(13) 10(7) |
| | | 11(7) | |
| D3 | 4 | 1(6) 2(6) 4(12) 5(4) 7(4) | 9(13) 10(7) |
| | | 11(7) 12(4) | |
| D4 | 4 | 1( 6) 4(12) 5(4) 6(4) 8(4) | 9(13) 10(7) |
| | | 12(4) | |
| PA | 4 | 1(4) 5(4) | |
| PB | 4 | 8(4) 9(4) 10(4) 11(5) 12(4) | |
| P | 4 | 1(13) 2(4) 3(4) 5(5) | |
| PG | 4 | 8(4) 11(4) 12(4) | |
| DA | 5 | 1(3) 2(3) 3(4) 4(4) 5(5) | |
| DB | 5 | 9(3) 10(4) 11(3) 12(5) | |
| DT | 5 | 1(3) 2(4) 3(4) 4(13) 5(5) | |
| DX | | 8(5) 9(5) 10(4) 11(4) 12(5) | |
| CU1 | 8 | 1(10) 2(10) 4(8) 5(8) 6(8) 7(13) | 9(13) |
| | | 11(11) 12(11) | |
| CU2 | 8 | 1(10) 2(10) 4(8) 5(8) 6(8) 7(13) | 9(13) |
| | | 11(11) 12(11) | |
| CU3 | 8 | 1(10) 2(10) 4(8) 5(8) 6(8) 7(13) | 9)13) |
| | | 11(11) 12(11) | |
| CU4 | 8 | 1(10) 2(10) 3(9) 4(8) 5(8) 7(13) | 8(8) |
| | | 9(13) 10(8) 11(11) 12(11) | |
| CU5 | 8 | 1(10) 3(9) 4(8) 5(8) 6(8) 7(13) | 8(8) |
| | | 10(8) 11(11) | |
| CUA | 8 | 1(9) 2(8) 5(8) | |
| CUB | 8 | 8(8) 9(8) 10(8) 11(9) 12(8) | |
| EC | 8 | 8(3) 9(8) 10(4) 11(13) 12(8) | |
| CT1 | 9 | 1(10) 2(10) 4(9) 5(9) 6(9) 7(13) | 9(13) |
| | | 11(11) 12(11) | |
| CT2 | 9 | 1(10) 2(10) 4(9) 5(9) 6(9) 7(13) | 9(13) |
| | | 11(11) 12(11) | |
| CT3 | 9 | 1(10) 2(10) 4(9) 5(9) 6(9) 7(13) | 9(13) |
| | | 11(11) 12(11) | |
| CT4 | 9 | 1(10) 2(10) 4(9) 5(9) 7(13) 8(9) | 9(13) |
| | | 10(8) 11(11) 12(11) | |
| CT5 | 9 | 1(10) 4(8) 5(9) 6(9) 7(13) 8(9) | 10(8) |
| | | 11(11) | |
| CTA | 9 | 1(8) 5(9) | |
| CTB | 9 | 9(9) 10(9) 11(8) 12(9) | |
| C. REG | 7 | | |
| OL | 12 | 1(12) 2(12) 3(12) 5(12) | |
| OS | 12 | 1(12) 2(12) 3(12) 5(12) | |
| RVA | 12 | 8(12) 10(12) 11(12) 12(12) | |
| TBL | 12 | 1(2) 2(13) 3(3) 4(13) 5(3) | 6(12) 7(3) |
| | | 8(16) 9(3) 10(4) 11(4) 12(17) | |
| GS | 13 | 8(13) 9(13) 10(4) 11(13) 12(12) | |
| OK | 13 | 1(12) 2(12) 3(12) | |
| RV | 13 | 9( 3) 10(12) 11(12) 12(13) | |
| SV | 13 | 1(16) 2(3) 4(3) 5(4) 6(13) | 7(5) |
| | | 10(12) 11(12) 12(12) | |
| RC | 13 | 1(3) 2(13) 3(13) 4(13) 5(12) | 6(4) |
| | | 7(3) 10(3) 12(5) | |
| ST RELAY | 14 | 1(4) 2(8) 3(9) 4(13) 5(3) | |
| ST KEY | 14 | ST/1 ST/2 14 | |
| TK | 13 | 4(3) 6(13) 8(13) 10(13) | |
| TBL REG | 17 | | |

Before going on to a detailed description of the operation of the test set, two alternative modes of operation will be described briefly with reference to FIGS. 18 and 19.

In FIG. 19, upon a test sequence being started (see START), trunk 1 is seized through jack J1, the dialling of the first digit D1 is simulated, certain tests are carried out on the line, and a decision is made automatically based on these tests. If a test is found negative, then a HOLD is set up on the trunk so far established, and the test set stops until the operator resets it. However, the HOLD remains on the trunk connection as far as it was established, so that a linesman can trace the connection to find the faulty component.

If the test is positive, then the next digit is dialled, and again the tests carried out. This continues until all the digits have been dialled, and the call is answered by the automatic responder at the called exchange.

The test set then moves automatically on to seize jack J2 (the next subscriber to be tested) and acts in a similar manner. After working on each subscriber's line in turn, the test set stops operating.

When operating under the AUTO mode illustrated in FIG. 19, the operation is initially the same, but the last four digits of the called number are —1199. When the last trunk J20 is tested, the procedure is repeated with a new called number —1299. Each time the trunk of jack 20 is tested, the called number changes once more, and the testing procedure terminates after testing on called number —9999.

USE OF TEST SET

The operator of the test set connects the jacks J1 through J20 by jumper leads 9 to a selected 20 of the groups of subscriber lines, as indicated in FIG. 2.

The operator sets the seven wafer switches SW1 through SW7 to a desired number to be called, e.g.

232–1799 which is the —99 common bus bar CBB of FIG. 2. He then closes the start key ST (FIG. 14); through its contacts 1 and 2 this energizes relay ST; Contacts ST (FIG. 13) close and ground is applied through the resistor RGS of 500 ohms and through lead R (connections Z2) to ring R1 of only jack J1 in FIG. 16. Through contacts ST/4 and ST/5 of the ST key (see FIG. 11), lamp LT.0 and lamp LU.1 are energized. Through ST relay contacts ST/1 (FIG. 4) is energized the relay P in FIG. 4 and also through that contact but via connection Z3 is energized the relay DT in FIG. 5. It is to be noted that the ground applied to relay DT is also applied to relay DX in FIG. 5, but the relay cannot operate at this time as the same ground appears as a shunt on the other side of relay DX through contacts DX/12. Because of this arrangement, the two relays DT and DX form a "flip-flop" circuit described in more detail below. Relay GS (FIG. 13) is connected at this time between —48 volts and the tip of jack J1, and is operated, which verifies that the tip and ring connections (T1 and R1) are not reversed. Energized relay GS locks operated by the application of ground through contacts ST/4, RC/2 and GS/8. The equipment of the telephone exchange, acting automatically, then applies ground to the sleeve of the trunk connected to J1, and this is applied through lead S2 and connection Z2 (from FIG. 16 to FIG. 13) and contacts GS/11 to operate relay SV.

At this point it is convenient to note that there are seven sets of "flip-flop" circuits each formed by a pair of relays:

a. relays TPA/TPB (FIG. 3): this is a timing flip-flop;
b. relays PA/PB (FIG. 4): used for pulse counting;
c. relays DT/DX (FIG. 5): used for digit and inter-digit;
d. relays DA/DB (FIG. 5): used for digit counting;
e. relays TA/TB (FIG. 3): used for trunk counting;
f. relays CTA/CTB (FIG. 9): used for connector group tens counting;
g. relays CUA/CUB (FIG. 8): used for connector group units counting.

These "flip-flops" are "set" or "reset" on alternate ground pulses. Odd numbered ground pulses operate the "A" relay but the "B" relay does not operate until the ground pulse is removed due to the shunt across its winding. Even numbered ground pulses release the "A" relay by shunting it down over the operated "B" relay contact. Removal of this ground releases the "B" relay.

One of each pair of the "flip-flop" relays described above is used to step the counting relays., i.e. the group of relays T1 to T10; the group of relays P1 to P5; the group of relays D1 to D5; the group of relays CT1 to CT5; and the group of relays CU1 to CU5. Thus relay "1" operates and locks when the "flip-flop" is "set". Relay "2" operates and locks when the "flip-flop" is "reset." Relay "3" operates and locks when the "flip-flop" is "set" for the second time. This sequence continues until all the associated counting relays are operated, at which time they commence releasing from relay "1."

Returning to the actual operation of the circuit in practice, when the ST key and the ST relay are operated, the timing "flip-flop" and counting circuit function. A first "ground" is applied by the operator of key ST, and a second ground is applied by the telephone office equipment. Relay SV has operated, so verifying that a first selector and the linefinder L/F1 have been seized and that the polarity is correct. The shunt is removed from the DX relay allowing it to operate, while relay DY is released. Relay DX changes the state of the "flip-flop" formed by relays DA/DB, which stops the timing circuit, and leaves relay DA operated. Through contacts DA/4 (FIG. 4) relay D1 is operated and establishes its own hold circuit through contacts D1/5 (operated).

PULSING CIRCUIT

Relay ST (FIG. 14) through its closed contacts ST/1 in FIG. 4 provides a ground so that capacitor P1 charges through resistor PR. The current through the relay P will slowly increase as the capacitor charges. Relay P therefore operates after a time lag that is determined by the adjustment of resistor PR and by whether one or both parts of capacitor P1 is used. Once relay P operates, by closure of its contacts P/1, the 500 ohms resistor RGS is placed across the tip and ring of the seized trunk (i.e. at Jack JK1) to form a pulsing loop.

As a result in FIG. 5, with the operation of both relays SV and P, first contacts SV/7 open, to release relay DT, its contacts DT/5 change to remove the shunt on relay DX and to operate that relay through connection Z3; and the closure of contacts DX/9 operates relay DA.

Closure of contacts DA/4 (FIG. 4 operates relay D1, setting up a hold circuit for that relay through contacts D1/5. Closure of contacts D1/10 (FIG. 7) illuminates lamp LD. 1 to show that the first digit is being dialed, and also operates register C. Reg.

The reversal of the contacts DX/10 (FIG. 4) operates the relay PG through DX/10, and contacts ST/1. Operation of contacts PG/11 removes the ground from relay P, capacitor P1 discharges through relay P via resistance PR, causing relay P to be slow releasing. Opening of contacts P/1 (FIG. 13) opens the loop to the trunk; closing of contacts (FIG. 4) P/12 and PG/12 operates the relay PA, promptly (contacts PA/1) releasing relay PG. Relay PG operates relay PB, and also closes the ground (contacts PG/11 FIG. 4) to charge capacitor P1 for the slow operation of relay P which then closes the loop to trunk (contacts P/1 in FIG. 13). This cycle continues until the digit set into the test device by switch WS1 is dialed.

Each of the switches WS/1 through WS/7 indicates the number of pulses to be sent to represent a dialed digit. The movable contacts of all seven switches are connected respectively to connections Z4 through Z10 of FIG. 6, and the leads P1 through P0 of each of the seven switches are connected to the correspondingly numbered leads in FIG. 5. The relay P is slow-to-make and also is slow-to-break, this characteristic being produced by the presence of the capacitor shunted across it and by the resistance which limits the rate of charging and discharging of the capacitor. As will be seen from FIG. 4, the relay P will, after a time lag, make, and thereupon by closure of contacts P/3 (contacts ST/1 and SV/5 already being operated) will cause relay PG to become operated. Once this happens, the contacts PG/11 will open, and the relay P will become operated. Thus relays P and PG together act as a pulse generator having a repetition rate depending upon the setting of the resistor RP and the magnitude of the capacitors P1.

As will be seen in the left hand side of FIG. 4, this alternate energization of relays P and PG will through the contacts PG/12 and P/12 cause the relays PA and PB to act as a driven flip-flop, so that the contacts of relay PB are driven cyclically in time with the action of relays P and PG. Each time relay P operates, by its contacts P/1 (see FIG. 13) it applies a dialing pulse to the Jack J1.

Further, when relay PB is operated, it operates its contacts PB/9, and on the first impulse this operates the relay P1, which then sets up its own hold circuit through its contacts P1/8.

It is to be noted that since contacts PB/9 are operated, this pulse cannot reach the other relays P2 to P5. However, once relay PB releases, relay P2 is operated through contacts PB/9, P1/10 (operated) and the relay P2 establishes its own hold circuit through its contacts P2/5. Thus relays P1 to P5 are energized in turn as the relay PB changes state. The flip-flop formed by relays PA/PB operates at half the repetition rate of the relay P, so that the group of relays P1 to P5 gives a count of the dial or ground pulses applied by the relay P. Thus pulses 1 to 5 cumulatively energize relays p1 to p5, while pulses 6 to 10 progressively de-energize relays P1 to P5. Thus the state of these relays indicates uniquely the number of pulses counted. As these pulses are sent, the contacts (see FIG. 5) P1/12 of relays P1 through P5 are connected in trun to the operated contacts DX/8. The control of WS1 is set to any one of the digits 1 through 0 and at the correspondingly numbered pulse, ground is provided through contacts D1/1 (FIG. 6) and switch WS1 and the appropriate operated and released contacts of relays P1 through P5 to change the state of the "flip-flop" formed by the relays DX and DT(FIG. 5). This change of state opens contacts DT/2 and releases any operated relays P1 through P5.

PULSE COUNTING

Relay PB (FIG. 4) is used to step the pulse counting circuit. When the pulses transmitted to the loop correspond to the setting of the switch WS1, a ground is extended over the combination of D-relays, the D-switch, the combination of P-relays and the operated DX and P relays, which shunts down relay DT (FIG. 5). Relay DT releasing by its contacts DT/2 and DT/3 (FIG. 4) causes relays PA, PB, PG and P1 through P5 to release if operated. Relay DT through contacts DT/1 and DT/4 (FIG. 13) extends the tip and ring of the trunk at jack J1 to polarity test relays OK and RV. Relay OK operates when ground is returned on the tip and battery on the ring, the diode shunting RV prevents relay RV operating. When battery is returned on the tip with ground on the ring relay RV operates to indicate the fault and relay OK is shunted by its associated diode.

INTER-DIGITAL TIMING

Relays P1 through P5 releasing cause relay DX (FIG. 5) to release which restarts the pulsing circuit to time the inter-digital interval, i.e. the relays P1 through P5 again start counting pulses 1 through 5. Relay DX released changes the state of "flip-flop" DA/DB which starts the trouble timer, but this is only used as an overall timer because "open" or "reversed" indications are timed by the inter-digit pulsing and an alarm is sounded after a count of four pulses by grounding the alarm (trouble) relay TBL (FIG. 12) through a contact P4/4 of relay P4 operated with DX (contacts DX/11)released. Relay DT (FIG. 5) operates after five inter-digit pulses, through contacts P5/11 which releases relays (FIG. 4) PG, PA, PB and P1 through P5. Relay DT also transfers the tip and ring (FIG. 13, tip T and ring R) from the polarity test relays OK and RV back to the 500 ohm pulsing loop through contacts P/1. During the inter-digital timing the set provides a 1,200 ohm loop comprised of resistance RGS, the diode shunting relay RV and the relay OK. Relay P5 released operates relay DX which changes the state of "flip-flop" DA/DB. With relay DA no longer operated, relay D2 is operated and forms its own hold circuit through D2/5. The digit counting relays step and the pulsing circuit driven by relay P commences to send the pulses of the next digit. Since relay D2 is now energized (contacts D2/1 operated), the ground of FIG. 6 is now applied through the second wafer switch WS2, and the number of pulses which are sent correspond to the setting of this second switch. The register C REG. of FIG. 7 is released when contacts D1/10 open, and the count on the register steps.

END OF 7TH DIGIT

From what has been set out in detail above, it will be clear how the test set can automatically send out a chain of pulses which represent the seven digits of the desired or "called" number. When the 7th digit has been dialed, the flip-flop DA/DB changes state and the relay DB operates. Further as relay D4 operates, the closing of contacts D4/12 stops the action of relay P, and thus the generation of pulses. The relay P is held operated by a ground applied through contacts of relay D3. The timing circuit is now automatically started and the test set waits for answer supervision from the connector circuit, that is to say from the number which has been dialed. As already mentioned, an automatic answering device is used, and this will operate to apply a ground to the tip T and battery on the ring, so that relay OK releases and relay RV operates. Operation of relay RV (FIG. 13) operates relay RC which provides its own locking or holding circuit through its contacts RC/2 operated. Operation of relay RC releases relays DA, DB, GS and RV and also by opening of the contacts RC/3 removes the loop from the trunk, which causes the switching equipment of the automatic answering device and of the telephone office to release. Relay SV releases upon removal of ground from the sleeve S of the trunk under test (and thus from jack J1) indicates that the switching equipment has released.

TRUNK STEPPING

The above description sets out how the first trunk T1 associated with jack J1 is tested. It is now necessary for the test set to switch to the second trunk, to carry out the steps described above to test that trunk, and then to proceed to the third trunk. The set or group of relays T1 to T10 (see FIG. 3) steps to transfer the test set circuit from the first trunk T1 to the second trunk T2. It will be seen that each of the relays T2 through T10, has a set of relay contacts in its input circuit which are closed once the preceding relay in the series T1 to T10 has operated. During the testing of trunk T1 relay TA is NOT energized and thus all relays T1 to T0 are NOT energized. This (see FIG. 16) contacts the leads T, R and S2 respectively to tip, ring and sleeve of jack J1. Relay T1 is energized when start key relay contacts ST/5 are operated and relay TA is energized to operate the contacts TA/4, and a hold circuit is then established to hold relay T1 and to prepare relay T2 for energization, by operation of relay contacts T1/7. When relay T1 is energized, contacts T1/1, T1/3 and T1/8 (see FIG. 16) become operated, and the leads T, R and S2 are disconnected from the tip, ring and sleeve of jack J1 and are transferred respectively to the tip, ring and sleeve of jack J2. The other relays T2 through T10 operate in a similar manner. The stepping is controlled by the action of the relay contacts TA/4 (FIG. 3) and thus by the state of energization of relay TA. The "flip-flop" formed by relays TA and TB is "half-set" when relay SV releases, and as mentioned above this happens when removal of ground from the sleeve S of the trunk under test takes place. The "half-setting" of flip-flop TA/TB causes relay RC to release, which "fully sets" the "flip-flop." The T1 through T10 relays step and transfer the test sets internal leads T, R and S2 to the next trunk to be tested. Assuming for the moment that that trunk is NOT busy (a ground on its sleeve indicates that the trunk is busy), this trunk is tested, and similarly the other trunks are tested until trunk T20 has been tested. Once that happens, relay EC is energized through contacts T10/12 (FIG. 8), and through its contacts EC/8 opens the holding ground on the trunk "flip-flop" formed by the relays TA/TB. The relays T1 through T10 all revert to their released state as a result of the opening of contacts EC/8, so that the leads T, R and S2 (FIG. 16) revert to their connections to the tip, ring and sleeve respectively of jack J1 and trunk T1. It may happen during testing that one of the trunks is found to be busy. If this happens, the ground already on the sleeve of that trunk will cause relay RC (FIG. 13) to re-operate through the diode BY in the lead S2, and this by closure of the contacts RC/1 (see FIG. 3) operates relay TB and releases relay TA. Operation of the relay contacts TA/4 causes the desired stepping to the next trunk.

TIMING FOR ALARMS

Relays TX, TY and TZ (see FIG. 3) form the counting circuit for the timing "flip-flop" formed by relays TPA and TPB. At the completion of dialing, i.e. once the seventh digit on wafer switch WS7 has been transmitted by the appropriate number of pulses, the counting circuit starts to function, and similarly it is caused to start to function whenever a trouble condition is encountered, by the removal of the operated ground from it. It will be seen that relay TZ can become energized only by the energization of relay TY (contacts TY/3) and further, that once relay TZ has operated, it isolates itself from relays TX and TY by opening of contacts TZ/8 and TZ/10. Further, as will be seen in FIG. 12, the alarm or trouble relay TBL is energized only if relay TZ is energized (contacts TZ/11 closed) and relay TY is released (contacts TY/5 closed). This condition occurs after a timing of 2 to 2.5 seconds, the range of timing arising from synchronization with the 120 "interruptions per minute" signal referred to earlier. The counting circuit starts to function at the completion of dialing of the seventh digit, and when the call is answered, so applying a ground to the sleeve S of the trunk, relay SV is operated, relay RV is operated, and by its contact RV/9 causes recycling of the counting relays TX, TY and TZ. Relay RC (FIG. 13) then operates and through its contact RC/10 (see FIG. 3) restarts the time counting. When the switching equipment releases, contact SV/2 (see FIG. 3) of relay SV stops the counting circuit. If the counting circuit completes its sequence without stopping at a recognizable trouble condition so that contacts TZ/11 operates (FIG. 12), the lamp C1 lights, indicating an overall timeout.

HOLDING A TROUBLE

When a trouble is detected, the alarm will sound and the test set will cease to progress from its instantaneous setting. The operator of the test set should then record all the lamp indications. The various lamps provide indications as follows:

ET — end of test
CI — call incomplete
SR — slow release of the trunk equipment
NA — no answer from the terminal equipment within the permitted time
OS — open sleeve
OL — open loop
RV — reversed polarity on the trunk tested The above are the trouble or fault lamp indications.

LD1 through LD7 — these lamps indicate which digit was being dialed when the trouble was detected, and so identify the stage of the exchange equipment where the fault is introduced into the trunk
LU1 through LU0— indicate the units digit of the number of the trunk (this is the number used in the test set only) on which the fault has been detected.
LT1 through LT2— indicates the tens digit of the number of this trunk
HL1 through HL0 — indicate the "hundreds" digit of the called number.
TL1 through TL0 — indicate the "thousands" digit of the called number.

Although the operator records the relevant data, it will be appreciated that this does not define the unique switching path in the exchange on which the fault was located: at each selector the incoming call could have been connected to any one of a number of subsequent selectors. The test set operator therefore operates the JK key which is numbered to match the lamps LT and LU which have lit. This (see FIG. 16) places a ground on the sleeve of the trunk being tested, and further connects the secondary winding of the coil TN across the tip and ring of that trunk. Since the primary winding of coil TN is connected to the high tone supply, this high tone is now applied to the trunk under test.

Testing of other trunks is now resumed by the operator pressing the key RLS (see FIG. 13), which operates the relay RC which by operating the flip-flop TA/TB causes the group of relays T1 through T10 to step to select the next idle trunk.

An important feature of the test set described is that it leaves the complete faulty trunk connection seized and carrying the high tone. This permits the maintenance staff at the actual exchange to trace easily the actual route taken by the call through the various selectors, and thus locate the selector on which the fault is introduced into the trunk connection. When in AUTO operation (see below) the next connector group is "dialed," the test set will proceed normally until the faulty trunk is reached, whereupon the ground on its sleeve S will cause this trunk to be treated as a "busy" trunk and therefore skipped.

MONITORING

Calls may be monitored by plugging a standard "1011" handset into the TK jack (see FIG. 13). That handset has a "talk" key, and when the operator puts that key to "talk," the relay TK is operated and this operates through contacts TK/10 the relay SV, and through contact TK/6 breaks the pulsing and polarity test loops while leaving the talk coil TKC connected through contacts TK/6 to the selected trunk. Ideally the talk jack TK should be used during the interval between "dialing" of trunks. If the "talk" key is operated in the TK jack during pulsing (i.e. sending of digits), the open loop trouble lamp OL lights and the alarm is activated. Operation of key RLS will release the alarm and will cause the test set to discard the seized trunk and to step onto the next idle trunk. Operation of the relay TK also releases the timing circuit, so that when the talk handset is used to stop a call, the automatic setting up of a trouble indication by "timeout" is prevented. Thus the operator can connect his handset to a seized trunk and through the handset talk to another operator working on the seized trunk.

TESTING FROM ONE TRUNK

In the above description of the test set, the trunks were seized and tested in sequence. For some circumstances, the test set operator will desire to select one only of the 20 connected trunks, and make a series of tests using that single trunk. By operation of the COT key (COT denotes CAMP ON TRUNK), the flip-flop formed by relays TA and TB can no longer change state, so that the test set remains licked or CAMPED on the selected trunk. Operation of the COT key lights lamps LT0 and LU1 and hold the trunk relays operated. To select the desired trunk, the operator repeatedly operates the key COS (see FIG. 3). Each time the key is operated, it causes the "flip-flop" formed by relays TA and TB to change state, and so steps the trunk selecting relays T1 through T10. Operation of the start key ST starts the test set, and all calls will originate from the selected trunk.

AUTO OPERATION

An important feature of the test set described is its ability automatically to initiate calls to all connector groups. That is to say, for the selected telephone central office (the first three digits, as selected by the wafer switches WS1, WS2 and WS3) the test set can automatically call all groups of numbers having thousands digits 1 through 0 and all hundred digits 1 through 0. The last two digits will remain constant, for example they may be set at —99 to cause the calls to terminate on the common bus bar CBB of FIG. 2 and thus terminate at the automatic responder 15.

Since, on a standard telephone dial, the numbers run from 1 through 9 and then 0, the first two digits of the number called are 11—, the second digit increasing through 2, 3, 4, 5, 6, 7, 8, and 9 and then becoming 0. Thus the test set calls

1899;
1999;
1099;
2199;
2299;

and similarly until it reaches 9999; followed by followed by 9099; then followed by 0099, which finishes the calling of all —99 numbers on that exchange.

To operate in the AUTO mode, the operator:

- sets switches WS1, WS2 and WS3, to indicate the exchange he wishes to call;
- sets switches WS4 and WS5 to "A";
- sets switches WS6 and WS7 to "9";
- sets the AUTO switch to "on";
- starts the operation by closing the start key ST. This will start operation at number —1199, and lamps TL1 and HL1 will light to indicate the first two digits. If desired, the "thousands" digit key THS can be operated one or more times, to cause the starting number to be larger than —1199, for example so that it could be —4199.

When the start key ST is operated, the test set will commence to send out through jack J1 and trunk T1 pulses representing dialed digits, as described above. Thus it will send out pulses to represent the digit set in by wafer switch WS1, then carry out the necessary tests; it will send out pulses and carry out tests similarly for the digits set in by switches WS2 and WS3; and it will commence sending out pulses for the digits of "thousands" wafer switch WS4.

It will be seen from an inspection of FIG. 10 that the last contact "A" is connected initially through contacts CT1/1 (relay CT released) to the "1" digit. Thus, as long as relay CT is released, the switch WS4 is effectively set to digit "1." A similar remark also applies to switch WS5.

It follows that the test set will "dial" number —1199 on trunk T1 and then switch to trunk T2, and dial the same number on that trunk. This procedure will be followed until number —1199 has been dialed on all twenty trunks T1 through T20.

When the call is completed on trunk T20, relay EC is operated by the closure of contacts T9/12 (FIG. 8).

In this connection, it will be seen in FIG. 3 that relays T1 to T10 become operated in turn by the operation of the relay TA, but that when relay T10 becomes operated, its contacts T10/6 and T10/8 operate to release one after another each of relays T1 through T9, as they count trunks.

When relay EC operates, if the AUTO key is operated a lock circuit for the relay is set up. Further, operation of the relay will "half-set" the flip-flop formed by relays CUA and CUB (FIG. 8) by operating relay CUA so releasing relay EC (contacts CUA/2). Release of EC through contacts EC/12 completes the setting of the flip-flop, and relay CUB is operated. Closure of contacts CUB/9 causes relay CU1 to operate and provide its own hold circuit.

Thus, each time the selected trunk passes from trunk T20 back to trunk T1, the group of relays CU1 through CU5 steps one position. In FIG. 10, this causes contacts CU1/1 to operate, so discontinuing the "A" terminal from the "1" terminal and connecting it instead to the "2" terminal. On the next operation of switch WS5, this switch will cause the dialing of the digit "2," i.e., the number called will be —1299, as desired. When all the 20 trunks have been used 10 times in this manner, so that the "0" digit on switch WS5 is involved, relay CU5 is operated and relay CU4 is released. This time, the "flip-flop" formed by relays CUA and CUB recycles the "CU" counting circuit and changes the state of the "flip-flop" formed of relays CTA and CTB, which steps the "CT" counting circuit in a similar manner, operating the CT relay contacts associated with wafer switch WS4. Eventually, connector group —00 (i.e. number —0099) has been tested, at which time the operation of relay EC "half sets" the two flip-flops containing respectively relays CUA and CUB and relays CTA and CTB, but does not release to "reset" them. Relay EC operates through its contacts EC/8 (FIG. 3) the alarm buzzer AL and causes the ET lamp (FIG. 8) to light to indicate the "end of the test" condition. Lamps LT0 and LU1 will light at this time but the trunk will not be seized since contact EC/11 (FIG. 13) has opened the loop.

AUTO PULSE COUNTING

It will be seen in FIG. 10 that the ten pulse leads marked P1 through P0 are wired via contacts of the CT- and CU- relays to the "A" positions of switches WS4 and WS5 respectively. Relay DT therefore releases to stop further pulsing when the pulses transmitted correspond to the setting of the CT- and CU- relays.

SKIPPING CONNECTOR GROUPS

It will be appreciated that the test set operates into more than one "office" or "exchange" designated by the first three digits of the telephone number, and further that some connector groups (i.e. the thousands digit and the hundred digits in the last four digits) may be non-existent in certain "offices." This is programmed for one office "code" at a time by inserting diode plugs of the form shown in FIG. 15, into holes in the matrix jack board PMB of FIGS. 1 and 13. As shown clearly in FIG. 15, the sleeve SKPS of the plug is connected through a diode SK to the tip SKPT.

The operation of the matrix board is best seen by consideration of a specific example, say the connector group —38—. A plug will be inserted into the hole which lies at the intersection of the vertical hundreds column 8 and the horizontal thousands column 3. Then, when in the normal course of AUTO operation, the setting of switch WS4 is tested to make a call with a connector group thousands digit of 3, the call to that connector group will carry on in the usual manner unless the switch WS5 is set up by its associated relays in the CU group to call digit 8. If that is the situation, then an energizing circuit for relay RC is set up through the matrix and the diode of the plug, so that relay RC operates. As on other occasions when RC operates, this causes the test set to select the next idle trunk. It follows that when a connector group is reached during AUTO testing, the test set will start out to call that group on each trunk in turn, but will abort the call as it reaches the fifth digit, so that after the last trunk T20 has been aborted, a new series of calls on the next connector group is set up.

FIG. 13 shows the connection of the key XB, which is when operated a shunt across the matrix PMB but cannot operate relay RC unless relay D2 is released and relays D3 and D4 are operated. As a result, when key XB is operated, each call will automatically be curtailed or aborted after the fifth digit is dialed. With this key in operation, the test set can test much of the selector equipment at the different exchanges or offices, and yet the set can be used to test offices in which no common connector bar is provided in the local office, i.e., in which there does not exist the facility of dialing into numbers ending in say —99.

TRANSMISSION TESTING

In the above description, the test set has been establishing trunk connection into certain telephone offices, and checking each stage of the trunk connection as it is established for certain "standard" faults. It will not, however, indicate certain other faults which in use give rise to distortion in speech on the trunk circuit.

An automatic transmission test set can be connected to jacks TT and TK, and can operate to apply a test signal to the trunk when the dialed call is answered by the automatic responder 15. When it is desired to carry out this additional test, the transmission test set is connected and the key TT (see FIG. 13) is operated. This key causes a ground to be connected to the tip of Jack TT when the call is answered, and the transmission set then places a loop on the tip and ring of jack TK, so operating relay TK. That relay through its contacts TK/6 and TK/8 connects the tip and ring of the trunk to coil TKC. The transmission set grounds the sleeve of jack TT which enables the timing circuit to function. The transmission set measures the level of the tone across the tip and ring of jack TK, and if satisfactory it grounds the ring of jack TT, which operates relay RC, causing the test set to release the trunk and step to the next trunk in the manner described above. If the level is outside predetermined limits, relay RC released allows the timing circuit to time out, which causes the CI lamp to light and causes the alarm buzzer AL to sound.

We claim:

1. A test set adapted to test each of a group of serially connected selector devices in a telephone exchange, which devices normally operate to establish a trunk, and comprising:

a. connections by which a plurality of selected subscriber's lines can be connected to the test set;

b. automatic pulse generating means arranged to apply to a selected subscriber's line a series of dialing pulses such as would cause the automatic serially connected selector devices to establish a trunk connection from the said subscriber's line to a proper termination point;

c. switch means in the test set are so interconnected to the said connections that the said plurality of selected subscriber's lines can be utilized in sequence to call the said termination point;

d. automatic switch means;

e. said automatic switch means being so interconnected with the said connections and the said switch means that the said plurality of selected subscriber's lines are used automatically in sequence to call the said termination point;

f. fault detection means arranged to carry out at least one test for a particular fault after each group of pulses, denoting a digit, has been transmitted;

g. means activated by the fault detection means and effective to arrest the pulse generating means upon the detection of a fault by the fault detection means; and h. switch means by which a holding signal can be applied to the trunk so far established to lock the selector devices in set position;

whereby an operator can trace the trunk as established to locate the component giving rise to the said fault.

2. A test set according to claim 1, and in which:

a. a tracing signal source is provided in the test set; and b. switch means in the test set enable the tracing signal to be applied to an established trunk, thereby facilitating tracing of the trunk by the operator.

3. A test set according to claim 2, and in which the said signal is an alternating current tone signal of suitable audible pitch.

4. A test set according to claim 1, in which:

a. a set of calibrated dials is provided; and b. manually operated switch means associated with the dials are interconnected so that the setting of the dials by the operator establishes the digits of a number denoting the said termination point.

5. A test set according to claim 1, and in which:

a. switch means in the test set are arranged to indicate a number which is to serve as the said proper termination point;

b. automatic switch means in the test set are arranged to control the said switch means in such a manner that the number indicating the said proper termination point will change in a predetermined manner;

whereby the test set is caused to call the said termination point through different routes in the telephone exchange equipment.

6. A test set according to claim 5, in which:

a. the number indicating the said proper termination includes both "thousand" and "hundred" digits indicating connector groups;

b. the said number also includes "tens" and "units" groups indicating a responder device; and c. the said variation in the number indicating the said proper termination point is effected by variation of the "thousands" and "hundred" digits.

7. A test set according to claim 6, and in which:

a. a further switching device is provided;

b. this further switching device can be preset to one or more connector groups;

c. this further switching device is connected to the said automatic switch means in such a manner that the automatic switch means when changing the number indicating the proper termination point will skip the preset connector group or groups.

8. A test set according to claim 7, and in which:

a. a matrix of intersecting columns and rows of holes forms part of the said further switching device;

b. electrical contacts are associated with each said hole;

c. a plug insertable into any one of the said holes is effective to engage the said electrical contacts;

d. the electrical contacts are interconnected with the automatic switching means in such a manner that the automatic switching means when changing the number indicating the proper termination point will skip a connector group uniquely represented by the column and the row containing the hole into which the plug is inserted.

9. A test set according to claim 1, and in which:

a. connections are provided by which a plurality of selected subscribers' lines can be connected to the test set;

b. automatic switch means are interconnected with the said connections in such a manner that the said subscribers' lines are used automatically in sequence to call the termination point;

c. switch means in the test set are arranged to indicate a number which is to serve as the said proper termination point;

d. further automatic switch means are arranged to cause the number indicated by the said switch means to change in a predetermined manner, so that the test set will call the said termination point through different routes in the telephone exchange equipment; and e. said automatic switch means and the said further automatic switch means are interconnected so that each number is first called on each selected subscriber's line in sequence, and then after operation of the said further automatic switch means, the next number to be called is called on each selected subscriber's line in sequence, the operation being repeated until each desired number has been called on each subscriber's line which is at the time available to accept such a call.

10. A test set according to claim 1, and in which:

a. the test set is arranged to test each subscriber's line before it applies dialing pulses to that line;

b. the test set is arranged, when it finds a line to be "-busy," to skip that subscriber's line and to proceed to the next subscriber's line and similarly test that line until a non-busy line is found; and c. the test set is arranged to test the first non-busy line so found.

11. A test set according to claim 9, and in which:

a. the test set is arranged to test each subscriber's line before it applies dialing pulses to that line;

b. the test set is arranged, when it finds a line to be "-busy," to skip that subscriber's line and to proceed to the next subscriber's line and similarly test that line until a non-busy line is found; and c. the test set is arranged to test the first non-busy line so found.

12. A test set according to claim 1, and in which:

a. switch means are provided arranged to apply a holding signal to a selected trunk;

b. said switch means are arranged to give a "busy" signal on the said trunk;

c. the test set is arranged to test each subscriber's line before it applies dialing pulses to that line;

d. the test set is arranged when a line is found to be "-busy" to skip that subscriber's line and proceed to the next line;

e. when the test set finds a non-busy line, it proceeds to test that line;

whereby, in use of the test set, and operator, having located a faulty trunk, can set the said switch means to apply the holding signal to that trunk, and then reactivate the test set so that it can continue to test other trunks through other subscribers' lines.

13. A test set according to claim 9, and in which:

a. switch means are provided arranged to apply a holding signal to a selected trunk;

b. said switch means are arranged to give a "busy" signal on the said trunk, c. the test set is arranged to test each subscriber's line before it applies dialing pulses to that line;

d. the test set is arranged when a line is found to be "-busy" to skip that subscriber's line and proceed to the next line;

e. when the test set finds a non-busy line, it proceeds to test that line;

whereby, in use of the test set, an operator, having located a faulty trunk, can set the said switch means to apply the holding signal to that trunk, and then reactivate the test set so that it can continue to test other trunks through other subscribers' lines.

14. A test set according to claim 1, and in which:

a. a test for "open loop" between tip and ring is automatically applied to each selected subscriber's line upon connection thereto; and b. upon such a condition being found, the test set withholds application of the dialing pulses and indicates this faulty condition.

15. A test set according to claim 1, and in which:

a. a test for "open sleve" is automatically applied to each selected subscriber's line upon connection thereto; and b. upon such a condition being found, the test set witholds the application of the dialing pulses and indicates this faulty condition.

16. A test set according to claim 1, and in which:

a. a test for reversed polarity between tip and ring is automatically applied to each selected subscriber's line upon connection thereto; and b. upon such a condition being found, the test set withholds the application of the dialing pulses and indicates this faulty condition.

17. A test set according to claim 1, and in which:

a. a test for the existence of battery potential on ring and ground on tip is automatically applied after each group of dialing pulses is sent; and c. in the absence of such a proper condition, the test set ceases the application of groups of dialing pulses and indicates the faulty condition.

18. A test set according to claim 1, and in which:

a. a timing sequence is commenced automatically after sending all the requisite groups of dialing pulses; and b. if the call is not answered within a predetermined time, the test set ceases to step and indicates this faulty condition.

19. A test set according to claim 1, in which:

a. a timing sequence is commenced automatically after the call is answered; and b. if ground is not removed from the trunk sleeve within a predetermined time, the test set ceases to step and indicates this faulty condition.

* * * * *